United States Patent [19]

Dyke et al.

[11] Patent Number: 4,881,225
[45] Date of Patent: Nov. 14, 1989

[54] DIGITAL LOOP CARRIER SYSTEM HAVING MULTIPLEXED INTERRUPT STRUCTURE

[75] Inventors: Harry J. Dyke, Oak Forest; Yoram Korn, Westmont, both of Ill.

[73] Assignee: Rockwell International Corporation, El Segundo, Calif.

[21] Appl. No.: 239,141

[22] Filed: Aug. 31, 1988

[51] Int. Cl.$^4$ .............................................. H04J 3/16
[52] U.S. Cl. ....................................... 370/95.1; 370/80
[58] Field of Search ................... 370/95, 89, 104, 56, 370/80, 81

[56] References Cited

U.S. PATENT DOCUMENTS

| | | | |
|---|---|---|---|
| 3,692,942 | 9/1972 | Inose et al. | 370/95 |
| 4,760,573 | 7/1988 | Calvignac et al. | 370/95 |
| 4,763,320 | 8/1988 | Rudolph et al. | 370/95 |
| 4,785,450 | 11/1988 | Bolgiano et al. | 370/95 |
| 4,791,629 | 12/1988 | Burns et al. | 370/95 |

Primary Examiner—Douglas W. Olms
Attorney, Agent, or Firm—C. B. Patti; V. L. Sewell; H. F. Hamann

[57] ABSTRACT

A system having a plurality of channel units for connection to a transmission line having a plurality of timeslots. The system has a counter and a parallel to serial register for providing a channel address via an address signal corresponding to a predetermined one of the plurality of timeslots to each of the channel units. A processor is provided for assigning an assigned address to each channel unit of the plurality of channel units, such channel unit being assigned to a different selected timeslot of the plurality of timeslots. Each of the channel units has a comparator for comparing the channel address in the address signal to the assigned address, the channel unit upon having a correspondence between the channel address and the assigned address, transmitting and receiving on the transmission line. A bus connects the plurality of channel units to the means for addressing. An active channel unit has the ability to request communication with the processor by an interrupt signal.

15 Claims, 3 Drawing Sheets

DIGITAL LOOP CARRIER SYSTEM HAVING MULTIPLEXED INTERRUPT STRUCTURE

BACKGROUND OF THE INVENTION

The present invention relates to an apparatus and method for use in channelizing telephone transmission equipment, and in particular, for identifying an interrupt from a channel unit in a PCM multiplexed system without requiring an individual interrupt. An interrupt provides a channel unit with the ability to request service from a central processing unit in the system.

The primary purpose of a PCM digital multiplexer system is the conversion of voice frequency signals to digital signals using standard sampling and encoding techniques and the multiplexing of 23 additional digitized samples into the T1 serial transmission format. Within the format the T1 serial bit stream are 24 eight bit locations commonly referred to as timeslots into which the encoded data can be placed. The normal approach to assigning these timeslots to the individual channels has been on a fixed physical slot to timeslot basis. In other words, each physical slot is identified to a particular timeslot.

In addition to the requirement of being able to assign any one of 24 available timeslots to the channel unit, each of the channel units must have the ability to request service from a central processing unit in the form of an interrupt signal. This interrupt signal would be used to identify to the central processing unit certain states or activities which are happening on each of the channel units customer interface leads. A particular requirement which led to this invention was the detection of a test voltage on the central office interface leads and the identification of this state to the central processing unit for further action.

At the present time there are two known methods used to select channel units for transmitting and receiving data from the serial bit stream at the respective timeslot. One known carrier system utilizes individual select leads from a common module which decodes the 24 states of a channel counter. This approach, although simple from a channel unit perspective results in a large number of common equipment pinouts and backplane connections. Other known systems perform the selection process in a similar manner with the decoding process performed on the channel unit instead of the common equipment. This approach results in less pinouts for the common equipment but more pinouts for the channel units. This approach to channel unit selection was previously sufficient for these non microprocessor hardware oriented carrier systems.

With the evolution of PCM carrier systems and a number of different timeslot assignment sequences, there is a requirement to provide the ability to re-assign physical slots to different timeslots within the T1 format in order to be backward compatible with the older systems. This requirement was addressed in prior art systems by altering the counting sequence of the channel counter only. This provided the ability to address other sequences in a simple manner. Future interoffice and digital loop carrier systems must not only provide this capability but also provide for a total random assignment of timeslots in order to address future formats and services as necessary.

An additional requirement is that a central processing unit must be able to communicate with individual channel units for various reasons. It was this requirement which led to the development of the present invention.

SUMMARY OF THE INVENTION

It is an objective of the present invention to provide a method of generating an interrupt signal from each channel unit on a common but which provides a means of identifying the interrupting channel unit to the central processing unit.

A means for conveying an interrupt signal to a common equipment module in the form of a multiplexed interrupt signal with the interrupt signal for each channel unit appearing on the interrupt bus at the assigned timeslot. A means for latching the address of the interrupting channel unit on the common equipment module for identification to the central processing unit.

It is an object of the present invention to provide an improved method and apparatus for addressing and assigning channel units to one of a plurality of timeslots in a pulse code modulation serial transmission format, such as a T1 line and for providing an interrupt signal to a central processing unit.

The present invention is a system having a plurality of channel units for connection to a transmission line having a plurality of timeslots. The system has a means for addressing for providing a channel address via an address signal corresponding to a predetermined one of the plurality of timeslots to each of the channel units. A means for processing is provided for assigning an assigned address to each channel unit of the plurality of channel units. A means for processing is provided for assigning an assigned address to each channel unit of the plurality of channel units, such channel unit being assigned to a different selected timeslot of the plurality of timeslots. Each of the channel units has means for comparing the channel address in the address signal to the assigned address, the channel unit upon having a correspondence between the channel address and the assigned address, transmitting and receiving on the transmission line. A means for providing a bus that connects the plurality of channel units to the means for addressing. An active channel unit has the ability to request communication with the processor by an interrupt signal.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
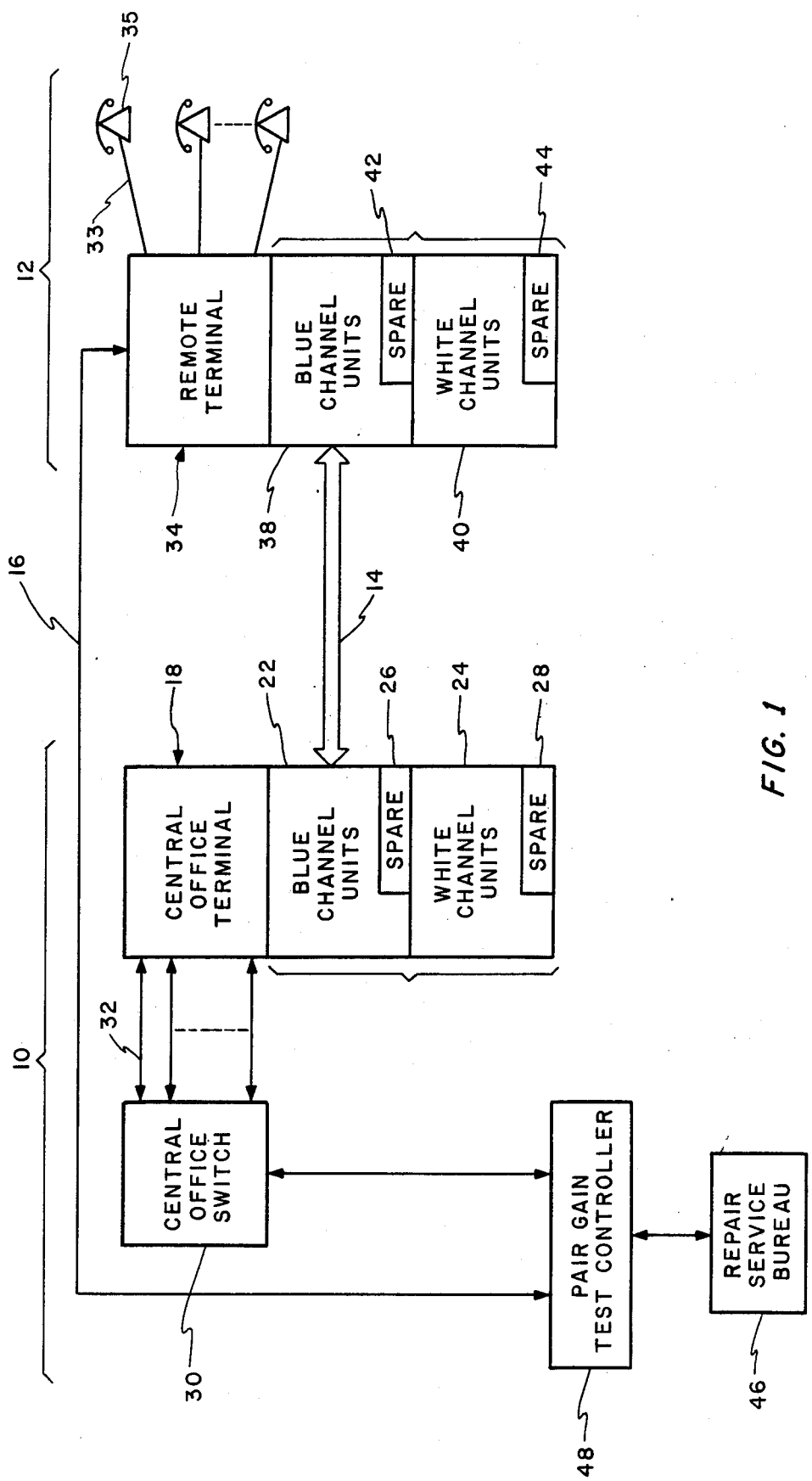
FIG. 1 is a general block diagram depicting a digital carrier loop system incorporating the present invention.

The present invention has general applicability but is most advantageously utilized in a digital loop carrier system of the type shown in FIG. 1. The FIG. 1 block diagram also depicts the incorporation of a pair gain test system as is known in the prior art with the digital carrier loop system.

As shown in FIG. 1, a central office location 10 is connected to a remote location 12 by digital transmission line system 14 and a bypass pair line 16. The transmission line system 14 is to be understood as having digital multipliers and digital lines between the central office terminal 18 and the pair gain test system. The central office 10 has a central office terminal 18 having channel banks. The channel banks are composed of a plurality of channel units in a blue channel system 22 and a white channel system 24. Each of the channel banks are composed of a plurality of channel units in a blue channel system 22 and a white channel system 24. Each of the channel systems 22 and 24 contain at least one spare channel 26 and 28 respectively. The references to 'white' and "blue" channel systems are terminology adapted by Rockwell International for its equipment.

The central office 10 also has a central office switch 30 which is connected by leads 32 to the central office terminal 18. Central office switches which are known in the prior art may be utilized for the central office switch 30 shown in FIG. 1. The central office terminal 18 provides derives subscriber channels over outgoing digital lines 14. A corresponding remote terminal 34 of the system separates the signals on the digital line 14 into a plurality of voice frequency analog signals on local drop wires 33 for delivery to a plurality of subscriber stations 35.

The remote terminal 34 has a blue channel system 38 and a white channel system 40 each having a plurality of channel units and at least one spare channel 42 and 44, respectively.

The central office 10 also includes a repair service bureau 46 for testing purposes. The repair service bureau 46 may be physically located at the central office 10. The repair service bureau 46 normally includes either manual local test facilities for manually testing loops or may include automatic testing equipment for automatically testing the loops. The principal function of the repair service bureau 46 is a testing of loops when a report of equipment failure is received from a customer at a subscriber station 35. The repair service bureau 46 is connected to a pair gain test controller 48 as is well known in the prior art. The pair gain test controller 47 is connected to the bypass pair line 16 and to the central office switch 30. As is known in the prior art a repair service bureau 46 will use the pair gain test controller 48 to perform a test on the system, thereby identifying for example, a defective channel unit in the remote terminal 34 for a particular associated subscriber station 35. The pair gain test controller 48 determines that a failure exists, but cannot determine if the failure occurs at the central office 10 or at the remote location 12.

Each of the blue and white channel units 22, 24 and 38, 40 in the central office terminal 18 and the remote terminal 34 and 96 channel units 100 divided into four digroups 102 (see FIG.2) of 24 channel units. A digital interface unit (DIU) 104 multiplexes the 24 channel units 100 onto the line interface unit (LIU) 106. The multiplexing function is symbolically represented by the switch 108. The LIU 106 is connected to a predetermined T1 line 110. The DIU 104 provides formatting, main clock source, multiplexing, etc. and the LIU 106 provides signal shaping, power, voltage levels, etc. A communication bus 112 connects a central processing unit (CPU) 114 to each DIU 104, and a secondary communications bus 115 to each CU of a digroup provides a communications path for each CU and CPU. In essence the DIU corresponds to a first address and the channel unit corresponds to a second address. In the embodiment shown in FIG. 2 and CPU 114 selects an address of the DIU 104 and an address of the channel unit 100 in order to establish a communication link with the channel unit 100.

Figure 2:
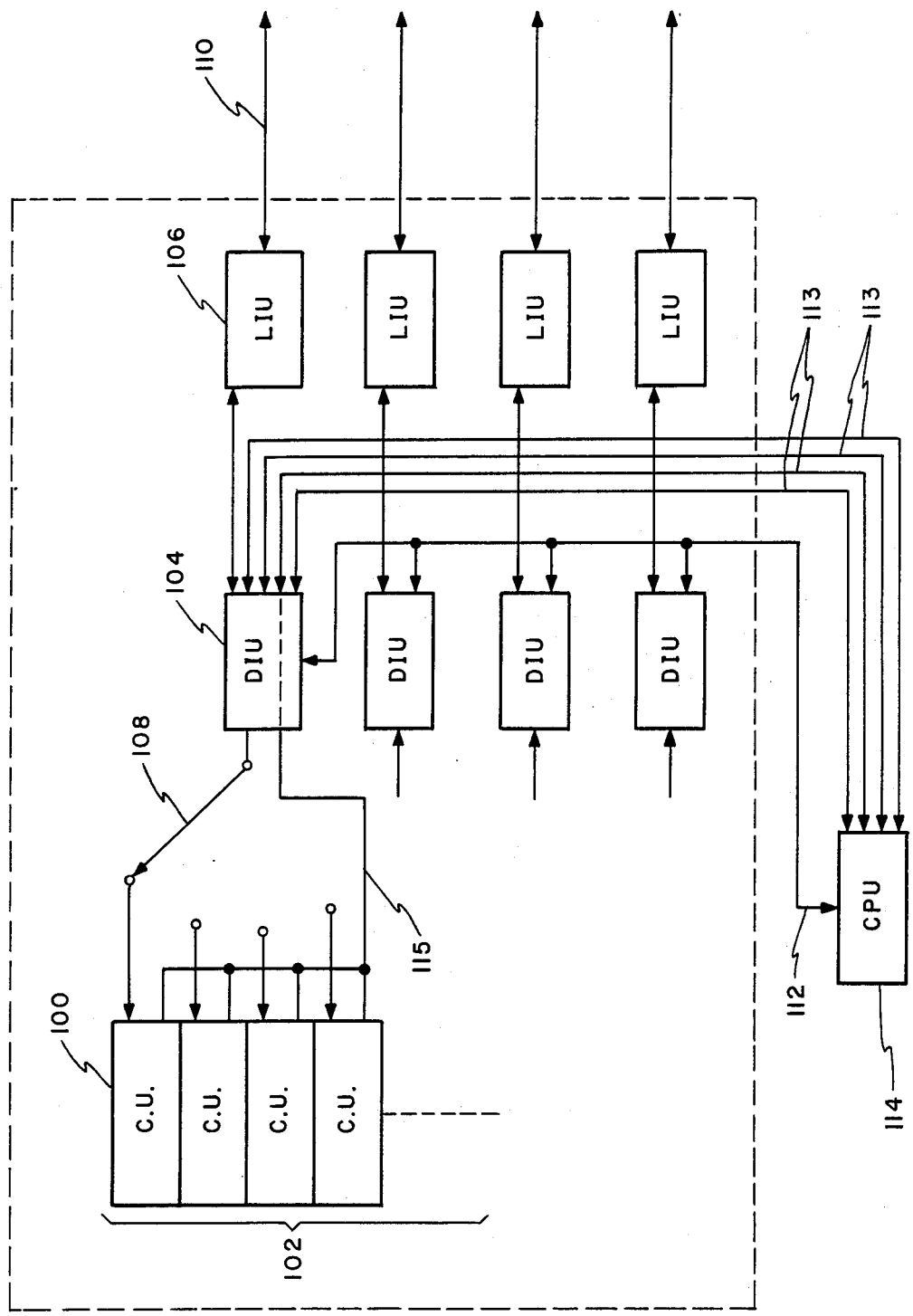
FIG. 2 is a more specific block diagram of the present invention as utilized in the FIG. 1 system.

Also shown in FIG. 2 is an interrupt lead 113 which connects the DIU 104 to the CPU 114. Each DIU has an interrupt lead 113 which connects each DIU to the CPU 114 and every channel unit has an interrupt capability built in the multiplexing function performed by the DIU and represented by switch 108. In this manner, each channel unit can interrupt the CPU via its DIU and the CPU can communicate to each channel unit through its DIU.

Figure 3:
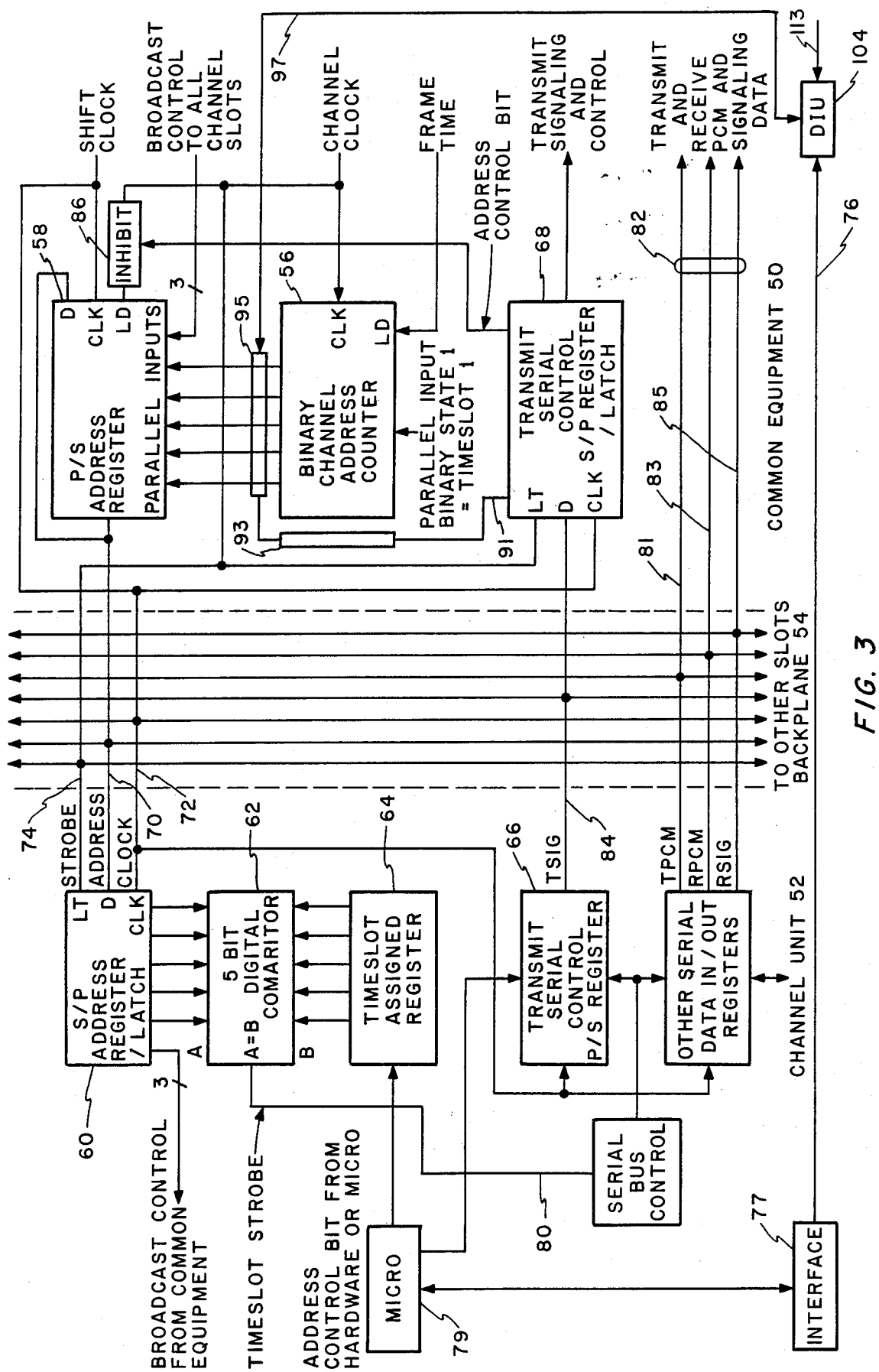
FIG. 3 is a more detailed schematic diagram of the present invention as utilized in the FIG. 1 system.

A schematic of the circuit of the present invention is shown in FIG. 3. The complete circuit is split between the common equipment module 50, referred to as the DIU, and each channel unit 52 and can be contained in either or both of the central office terminal and the remote terminal. The interface between the common equipment module and each channel unit in the form of the backplane bus structure 54 is shown in the drawing between the dotted lines.

A primary system requirement called for a backplane bus architecture which was common to all physical slots. In other words, a common bus approach to all physical slots meant that there could not be a signal lead that was specific to any particular slot such as a slot select signal. This requirement was necessary to facilitate bus selection for the various modes and is met by this circuit.

The channel address counter 56 in the common equipment module 50 is a binary counter which is preloaded to a count of 1 at the beginning of a T1 frame. A complete T1 frame includes the 24 timeslots previously described plus a bit which is used to identify the beginning of the frame or timeslot 1. This counter 56 is incremented once for each timeslot or 24 times each frame. The parallel to serial shift register 58 in the common equipment module 50 converts an address to a serial format which is distributed to all channel unit physical slots along with the clock and strobe signals. The address appears on a serial clock bus 70, the clock signal appears on a serial clock bus 72, and the strobe signal appears on a serial strobe bus 74. The strobe signal is used to latch the serial address into a serial to parallel register 60 on each channel unit 52. In this manner, all 24 timeslot addresses are latched on each and every channel unit 52. Essentially the channel unit serial to parallel register 60 is duplicating the channel address counter 56 on each channel unit 52.

Since the serial PCM data is comprised of 8 bits for each timeslot and the entire backplane bus structure follows this same format, the serial address but 70 must present an address every 8 shift clocks of the parallel to serial address register 58. Because only 5 bits are required to address 24 channels in binary format, the remaining bits on the address bus 70 can be used to broadcase control information to all channel units 52 as shown. The address and control information is latched with the same strobe signal and the address information is presented to a 5 bit digital comparator 62.

Each channel unit 52 then compares the received address with the address assigned to it in the timeslot assigned register 64. This register 64 is assigned a timeslot address which is one of the 24 available timeslots appearing on the serial address bus 70. In the system implementation, this is accomplished via a data link 76 to each channel unit through each DIU from the system controller 78, such as CPU 114 via DIU bus 112 and CU bus 115 in FIG. 2. When a comparison is made between the address latched in the serial to parallel register 60 and the timeslot assigned register 64, an input/output strobe signal is generated on line 80 which is utilized by the channel unit 52 to transmit and receive data in serial form on the data bus 82. For those situations where it is necessary to inhibit transmission on the data but 82, the assignment of timeslot0 to the timeslot assigned register 64 results in no comparator output as this counter state does not appear on the serial address bus 70. This basically describes the programmable timeslot assignment feature of this circuit.

The data link 76 can be connected through an appropriate interface 77 to a microprocessor 79 in each of the channel units 52. Each of the channel units 52 has a physical address which is dependent upon its physical location in the backplane of the equipment. The present invention provides for connecting a selected channel unit to the T1 line in a selected timeslot which is independent of the channel units physical address.

The second part of this addressing circuit provides for the ability of the channel unit 52 to transmit or receive data in multiple timeslots. This case would be used for those channels units which provide wideband voice or high speed data services. An approach to providing this capability with the circuit as described up to this point would require the use of multiple timeslot assignment registers and comparators which would perform comparisons between the serial to parallel address register 60 and as many timeslot registers as necessary to accommodate the number of timeslots.

The approach taken in this circuit to accommodate this situation involves the use of an address control bit which is part of a transmit signal TSIG on the transmit serial control bus 84 as shown. This transmit serial control bus 84 is output by the transmit serial control parallel to serial register 66 in the channel unit 52 synchronized with the PCM data bus 82. This address control bit can be used to inhibit the loading of the channel address counter 56 into the parallel to serial address register 58 on the common equipment 50 as shown. The PCM data bus 82 has at least a transmit PCM bus 81, a receive PCM bus 83 and a receive signalling and control bus 85. Via a clock signal on the clock bus 72, the transmit signal TSIG on the transmit serial control bus 84 is synchronized with the PCM data bus 82.

For the normal single timeslot transmission by the channel unit 52, the address control bit would be set to a predetermined setting to cause the loading of the channel address into the parallel to serial address register 58 to take place once every timeslot. If a channel unit 52 was of a type which required an additional timeslot, the address control bit would be set to indicate a request for an additional timeslot. Within the common equipment 50 is a control bus serial to parallel register 68 which receives the control bit each and every timeslot. This bit can represent a request for another timeslot. When this bit is latched in serial to parallel register 68 in the request for an additional timeslot state, this bit would inhibit the loading of the parallel to serial address register 58 via inhibit gate 86 for that one request.

Since the parallel to serial address register 58 is configured to recirculate the previous address, the previous address which resulted in this inhibit being received would be duplicated on the serial address bus 70. Because the same address would be latched in the channel unit serial to parallel register 60 as before and the same comparison made on the channel unit 52, the strobe which indicates the timeslot to transmit or receive data from the bus 82 would be extended by the additional timeslot. This inhibit of the loading of a new timeslot address into the parallel to serial register 58 could continue for as many timeslots as is required by the channel unit type. During this process, the channel address counter 56 continues incrementing, but those addresses which are inhibited from loading never appear on the serial bus 70.

Upon release of the address control bit, the address appearing on the serial bus 70 is the address of the next available timeslot. Upon latching of this different address in the channel unit 52, the comparison is no longer made and the channel unit 52 would relinquish control of the data and signalling bus 82. In this manner, the channel unit 52 has control of and access to the bus 82 for the bandwidth necessary to support the type of service to which it is designed.

It is to be appreciated that the first channel unit 52 to receive control of the T1 line via the DIU 104 sends the transmit signal TSIG on the bus 84 at the same time it transmits and receives on the PCM data bus 82 in order to obtain multiple timeslots. For the next or second strobe cycle on the strobe bus 74 the counter 56 increases to the next timeslot, but this timeslot address is not loaded into register 58. This is because the address control bit latched in register 68 inhibits the loading of register 58. Therefore register 58 sends the same address of the first channel unit on the address bus 70. Only when this channel unit releases the address control bit on the transmit signal TSIG and the resultant loading of the next address from counter 52 can another channel unit have access to the T1 line.

Further as shown in FIG. 3 is a second control bit in the transmit signal TSIG on the transmit serial bus 84 causes the register 68 to output a signal on line 91. Line 91 connects to a transition detector 93 which is connected to a latch 95. Latch 95 when activated latches the address from the counter 56 which is the address of the interrupting channel unit. As a result, an 'active' channel unit can generate an interrupt which can cause a connection to be established with the CPU 114 through the DIU 104. The DIU 104 is also connected to the register 95 by request line 97. Alternatively, the register 95 can be directly connected to the CPU 114.

The advantages provided by this circuit in a digital multiplexer system are detailed below:

A. Common bus interface to all physical slots as there are not individual select leads.

B. The same addressing circuitry can be used for all channel units and is not based on the number of timeslots needed.

C. The address of the first timeslot is the only address that needs to be assigned to the channel unit.

D. The channel unit type and hardware defines the amount of bandwidth and therefore the number of timeslots required.

E. Additional timeslot addresses requested by a channel unit never appear on the address bus. This would eliminate bus contention if other channel units were inadvertently assigned those timeslots.

F. Dynamic control of the bandwidth by the channel unit is possible.

G. Built-in priority scheme based on the lowest address is possible to alleviate bus contention problems or to allow a priority based multiplexing scheme.

H. Serial address bus uses only 5 bits of the 8 available. Additional bits used as broadcast control bits to all channel units.

I. The ability to latch an address based on an interrupt from a channel unit and use the latched address to identify an interrupting channel unit regardless of the timeslot assigned.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system having a plurality of channel units for connection to a transmission line having a plurality of timeslots, said system having at least a central processing unit, comprising:
   means for addressing for providing a channel address via an address signal corresponding to a predetermined one of said plurality of timeslots to each of said channel units;
   means for processing for assigning an assigned address to each channel unit of said plurality of channel units, each channel unit being assigned to a different selected timeslot of aid plurality of timeslots;
   each of said channel units having means for comparing said channel address in said address signal to said assigned address, said channel unit upon having a correspondence between said channel address and said assigned address being an active channel unit;
   means for providing a bus for connecting said plurality of channel units to said means for addressing; and
   each of said channel units having interrupt means for signalling a means for interrupting in said means for addressing connected to said processing unit, thereby establishing a communication path between said active channel unit and said central processing unit.

2. The system according to claim 1 wherein said means for signalling includes a means for providing a transmit signal TSIG having a predetermined interrupt bit indicating a request by the active channel unit to the central processing unit.

3. The system according to claim 2 wherein said means for addressing has a transmit serial control register for receiving said transmit signal TSIG from a channel unit and in response to said interrupt bit in said signal TSIG outputs a signal to said means for interrupting which in response thereto sends a request to the central processing unit.

4. The system according to claim 3 wherein said means for interrupting has a transition detector for receiving said interrupt bit, said transition detector having an output connected to a latch, said latch receiving a count signal representative of said channel address, said count signal provided by means for counting in said means for addressing, said latch having an output for sending a request to said central processing unit, said request containing said channel address.

5. The system according to claim 4 wherein said communication path is a data link line between said central processing unit and said active channel unit.

6. The system according to claim 5 wherein said output of said latch is connected to an input of a digital interface unit which is connected to said central processing unit by a request line and wherein said data link includes a first data link bus between said digital interface unit and said central processing unit and a second data link bus between said digital interface unit and said active channel unit.

7. The system according to claim 1 wherein said means for processing causes each of said channel units to transmit and receive in different timeslots on said transmission line.

8. The system according to claim 7 wherein said means for processing causes a channel unit to transmit and receive during at least two of said timeslots on said transmission line.

9. The system according to claim 8 wherein a selected channel unit transmitting and receiving during a timeslot can continue to transmit and receive during at least one following timeslot until said selected channel unit relinquishes control of the transmission line.

10. The system according to claim 1 wherein said means for addressing has a means for counting outputting a count signal to a parallel to serial register, said parallel to serial register outputting said address signal on said means for providing a bus upon receiving said count signal.

11. The system according to claim 10 wherein said count signal is periodically incremented and synchronized to serially occurring timeslots on said transmission line.

12. The system according to claim 10 wherein a means for latching is connected to said parallel to serial register for causing said parallel to serial register to output the same address signal corresponding to a timeslot as was output for a previous timeslot to provide multiple timeslot assignment to a selected channel unit.

13. The system according to claim 1 wherein each of said channel units has a parallel to serial register for receiving at least said address signal on said means for providing a bus, has a timeslot assigned register for receiving said assigned address from said means for processing, and has a means for comparing connected to respective outputs of said parallel to serial register and to said timeslot assigned register.

14. The system according to claim 1 wherein said means for providing a bus has a least an address line, a clock line and a strobe line connected between said means for addressing and each of said channel units.

15. The system according to claim 13 wherein said means for providing a bus further has a plurality of lines connecting each of said channel units to said transmission line.

* * * * *